June 2, 1942.  T. R. HARRISON  2,284,817
MEASURING AND CONTROL APPARATUS
Filed Sept. 25, 1936   3 Sheets-Sheet 1
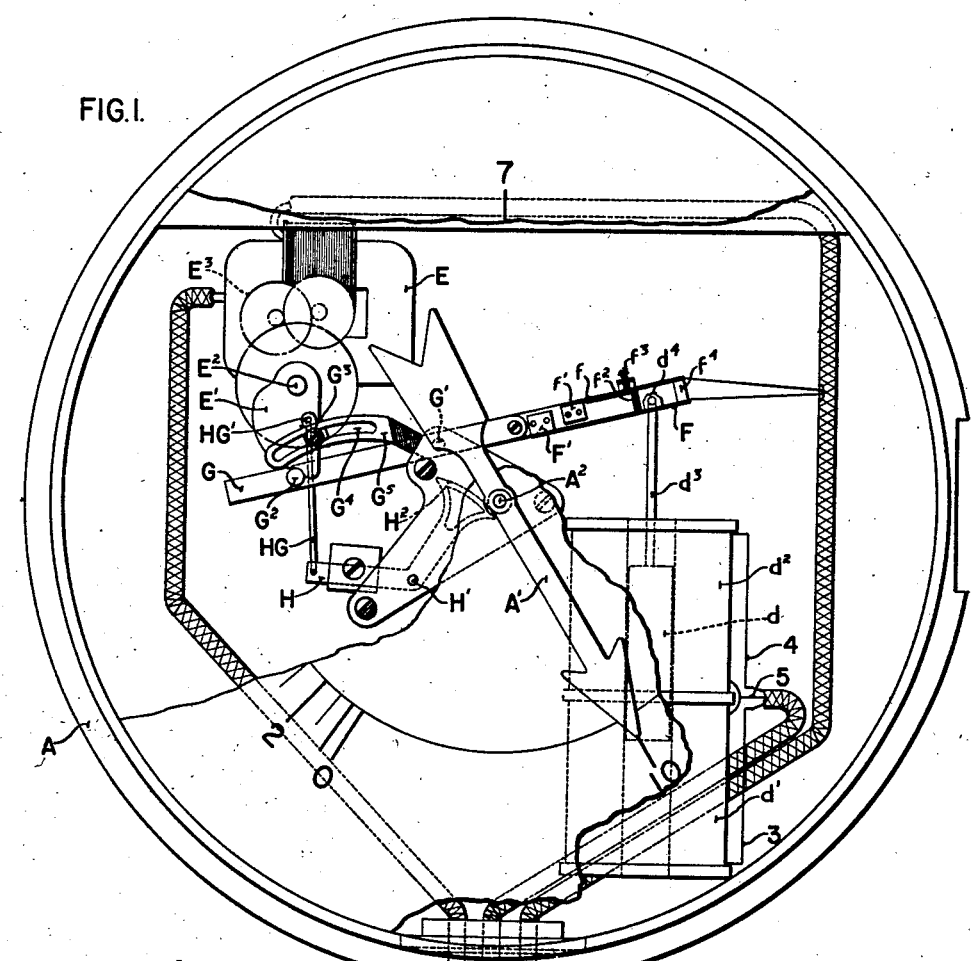
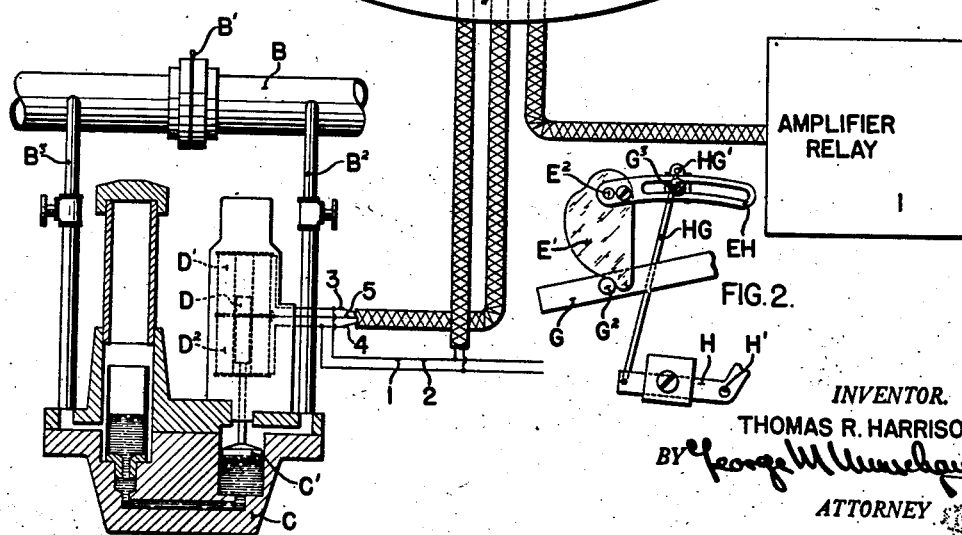
INVENTOR.
THOMAS R. HARRISON
BY *George M. ...*
ATTORNEY June 2, 1942.　　　T. R. HARRISON　　　2,284,817
MEASURING AND CONTROL APPARATUS
Filed Sept. 25, 1936　　　3 Sheets-Sheet 2
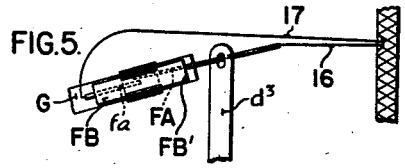
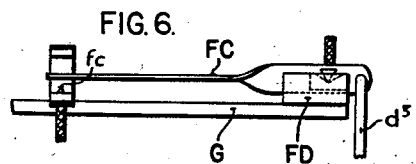
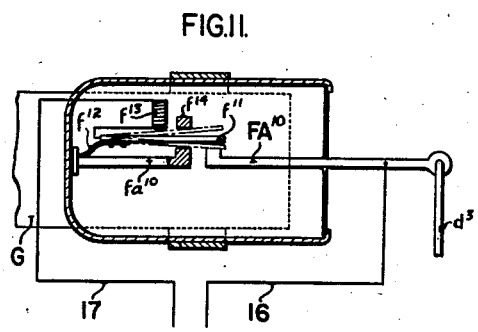
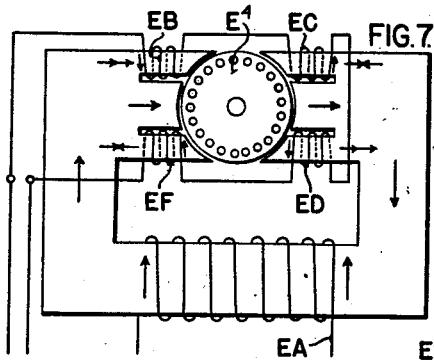
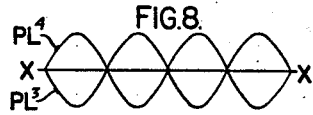
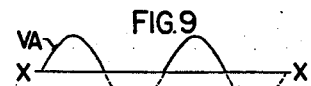
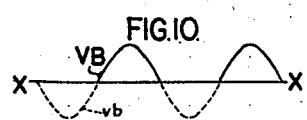
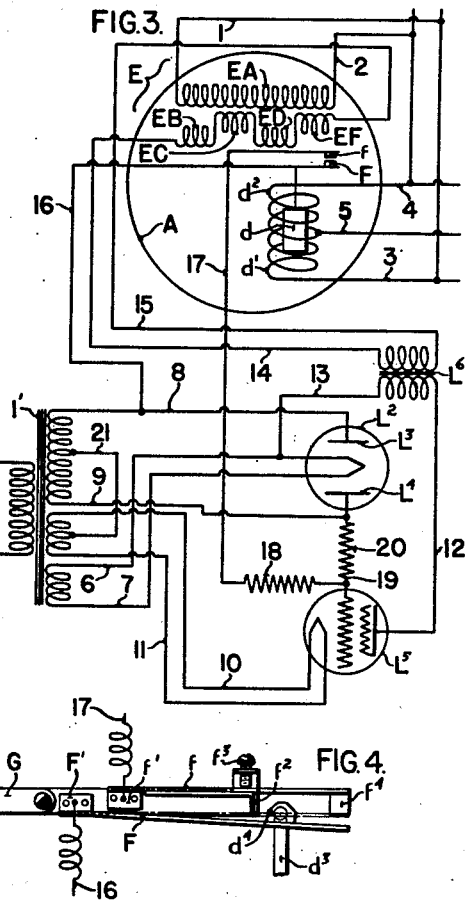
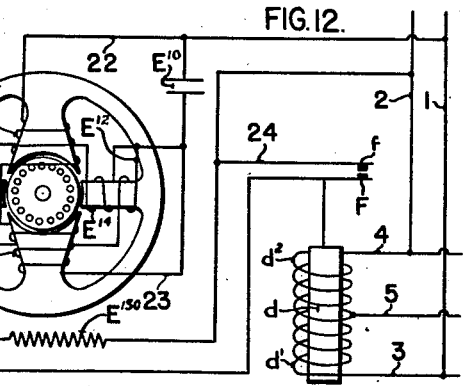
INVENTOR.
THOMAS R. HARRISON
BY
ATTORNEY.

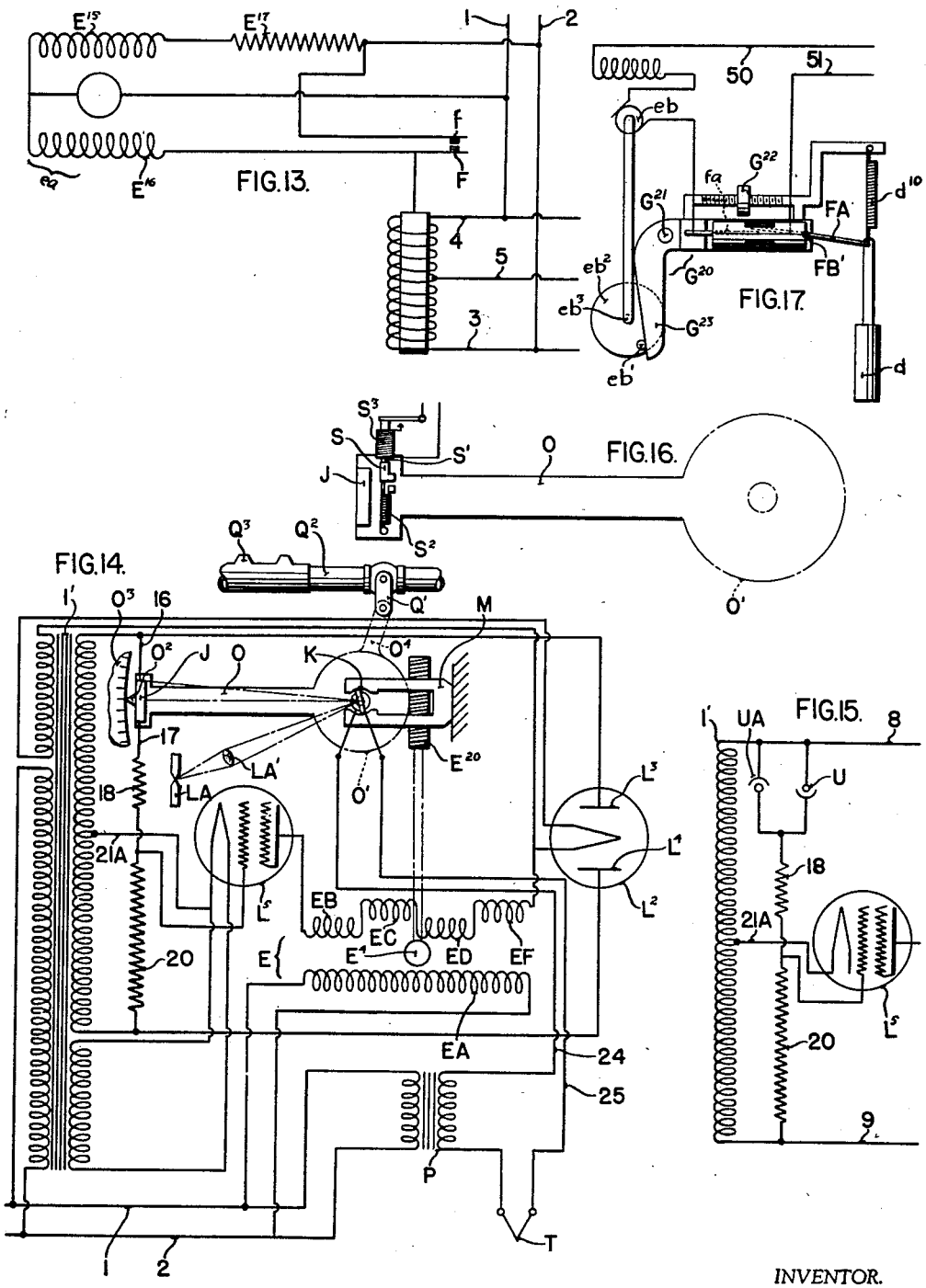
June 2, 1942.     T. R. HARRISON     2,284,817
MEASURING AND CONTROL APPARATUS
Filed Sept. 25, 1936     3 Sheets-Sheet 3
INVENTOR.
THOMAS R. HARRISON
BY
ATTORNEY.

Patented June 2, 1942

2,284,817

UNITED STATES PATENT OFFICE 2,284,817

MEASURING AND CONTROL APPARATUS

Thomas R. Harrison, Wyncote, Pa., assignor to The Brown Instrument Company, Philadelphia, Pa., a corporation of Pennsylvania Application September 25, 1936, Serial No. 102,482

24 Claims. (Cl. 172—239)

The general object of the present invention is to provide improved apparatus of the type comprising a relay mechanism for producing effects in accordance with the deflection of an element which controls said mechanism and deflects in accordance with variations in a control quantity or in a quantity to be measured, and in which because of the small magnitude of the element deflecting force or for some other reason, it is not possible or desirable to have the said effects directly produced by the deflecting element.

In one advantageous use of the invention, for example, an element deflecting in accordance with changes in the value of a quantity to be measured, is included in an instrument comprising a relay mechanism for adjusting the recording pen, indicating pointer, or other exhibiting part of the instrument in accordance with the deflections of the deflecting element.

A more specific object of the present invention is to provide improvements in a relay mechanism including an electric motor and control provisions therefor, which is adapted for use in apparatus of the character above mentioned. A still more specific object of the present invention is to provide simple and effective means whereby an alternating current relay motor is suitably controlled for intermittent operation in either direction through control means for varying the current flow in a control circuit, and electronic amplifying means through which the variations in said current flow effect changes in a motor energizing circuit, to thereby reverse the direction of rotation of the motor with desirable rapidity, and as a result of a current flow through the control circuit which, at its maximum, is relatively minute. The small required maximum current flow in the control circuit, permits that circuit to be controlled by contacts forming a part of the circuit and moved into and out of engagement with one another to vary the control current without objectionable arcing is practically convenient and desirable in many cases, and my invention includes special provisions, desirably employed in some cases, for effecting a chattering engagement of the control contacts under conditions so that the periods during which the relay motor is then successively energized for operation in opposite directions, are so brief that the motor is given no movement, or, at least, no movement of significant extent.

In lieu of separable control contacts for varying the current flow in the control circuit, my invention permits the use of a resistance which may have its conductivity varied rapidly and widely, as the resistance of a selenium cell may be varied by variations in light impingement thereon. For use with forms of my invention in which the control current is varied by variations in light impingement on a selenium cell or the like, I have devised special means for obtaining the same operative effect which I obtain by effecting the above mentioned chartering engagement of control contacts.

The various features of novelty which characterize my invention are pointed out with particularity in the claims annexed to and forming a part of this specification. For a better understanding of the invention, however, its advantages, and specific objects attained with its use, reference should be had in the accompanying drawings and descriptive matter in which I have illustrated and described preferred embodiments of the invention.

Of the drawings:

Fig. 1 is a view partly diagrammatic, of a flow meter arrangement including an indicating construction shown in front elevation with parts broken away and removed;

Fig. 2 is an elevation of a modified form of a portion of the apparatus shown in Fig. 1;

Fig. 3 is a wiring diagram of the relay motor and amplifier relay means of Fig. 1;

Fig. 4 is an elevation on a larger scale than Fig. 1, of the control contact arrangement shown in Fig. 1;

Figs. 5 and 6 are elevations of respectively different modifications of the control contacts arrangement shown in Fig. 4;

Fig. 7 is a somewhat diagrammatic representation of the relay motor shown in Fig. 1;

Fig. 8 is a diagram showing rectifier plate or anode voltages;

Fig. 9 is a diagram showing output transformer voltages during periods in which the control contacts are separated;

Fig. 10 is a diagram showing output transformer voltages during periods in which the control contacts are in engagement;

Fig. 11 is an elevation of a control contact arrangement including contact vibrating means;

Fig. 12 is a diagrammatic illustration of a modification of the apparatus shown in Figs. 1 and 3;

Fig. 13 is a diagrammatic representation of a second modification of the apparatus shown in Fig. 1;

Fig. 14 is a diagrammatic representation of a third modification of the apparatus shown in Fig. 1;

Fig. 15 is a diagrammatic representation of a modification of a portion of the apparatus shown in Fig. 14;

Fig. 16 is a somewhat diagrammatic representation of a modification of another portion of the apparatus shown in Fig. 14, and Fig. 17 is a view of still another modification of the apparatus of Fig. 1.

The embodiment of the invention illustrated by way of example in Figs. 1 and 3 of the accompanying drawings, comprises an instrument A including an exhibiting element in the form of a pointer A', deflecting about the axis of its supporting shaft $A^2$ to exhibit variations in the flow of fluid through a conduit B. The latter includes a diaphragm B' formed with a measuring orifice. The pressures in the conduit B at opposite sides of the diaphragm B' are transmitted by pipes $B^2$ and $B^3$ to the high and low pressure legs, respectively, of a U tube manometer C containing a sealing liquid, usually mercury. A float C' resting on the sealing liquid in the high pressure leg of the manometer, supports and gives up and down movements to a magnetic body or armature D, as the flow through the conduit B decreases and increases.

The armature D is axially movable in a solenoid coil comprising two end to end sections D' and $D^2$, the relative inductances of which are varied by the vertical movement of the armature D. The armature D and coil sections D' and $D^2$, form the transmitting element of an inductance bridge, the receiving element of which forms a part of the instrument A. The said receiving element comprises a vertically disposed solenoid coil comprising end to end sections $d'$ and $d^2$, and an armature $d$ axially movable in said coils. The remote terminals of the coil sections D' and $D^2$ are connected to the remote terminals of the coil sections $d'$ and $d^2$ by conductors 3 and 4, respectively. The adjacent terminals of the coil sections D' and $D^2$ are connected by a conductor 5 to the adjacent terminals of the coil sections $d'$ and $d^2$. The inductance bridge is energized by alternating current supply conductors 1 and 2 connected to the bridge conductors 3 and 4, respectively.

With the arrangement described and shown, an up or down movement of the armature D produced by a change in the rate of flow through the conduit B, unbalances the bridge by changing the relative inductances of the coil sections $D^1$ and $D^2$, and thereby creates changes in the currents flowing in the coil sections $d^1$ and $d^2$, which produce a down or up movement of the armature $d$ equal in magnitude to the said movement of the armature D, whereby the bridge is again brought into its balanced condition, which is that in which the inductance ratio of the coils $D^1$ and $D^2$ is equal to the inductance ratio of the coil sections $d^1$ and $d^2$. Further explanation herein of the operation of the inductance bridge is unnecessary, as such a bridge in association with a manometer as disclosed herein, is fully disclosed in my Patent No. 1,743,852, granted January 14, 1930, and is in extensive use in flow meters constructed in accordance with the disclosure of that patent.

Changes in the vertical position of the receiver armature $d$ produce corresponding changes in the position of a control contact F to which the armature $d$ is connected by its stem $d^3$. As shown, the contact F is in the form of a spring arm having one end anchored at $F^1$ to a lever G carried by a pivot shaft $G^1$ supported in the instrument framework. As hereinafter explained, the contact F is adapted to engage and separate from a cooperating contact $f$ carried by the lever G and normally rigid with respect to the latter, but preferably is in the form of a spring arm anchored at $f^1$ to the lever G and adapted to be flexed for calibration adjustment purposes by an adjusting screw $f^3$ carried by the lever G. As shown, the contact $f$ includes a transverse stop portion $f^2$ intermediate its ends and an end contact portion $f^4$. The contacts $f$ and F are so shaped and disposed that normally the stop contact $f^2$ is not engaged. As shown, the stem $d^3$ has a transverse portion $d^4$ at its upper end which engages an upstanding projection on the upper side of the contact F. The latter is adapted to support the weight of the armature $d$, without being flexed out of engagement with the contact $f$, but is flexed out of such engagement when the armature $d$ is subjected to electromagnetic force tending to move it down.

The engagement of the contacts F and $f$ starts a relay motor E into operation in one direction, and the separation of those contacts starts the motor into operation in the opposite direction, by means of an amplifier relay, or motor controller, hereinafter described. The operation of the motor E, effected when the contacts F and $f$ separate, produces a clockwise adjustment of the lever G, which is continued until the contacts F and $f$ again engage. The operation of the motor E produced when the contacts F and $f$ engage, gives the lever G a counter-clockwise adjustment which is continued until the contact $f$ is moved out of engagement with the contact F. The lever G is gravitationally biased for clockwise movement, and has its clockwise movements restrained, and is given counter-clockwise movements by the motor E acting through a cam member $E^1$. The latter has a cam edge engaging a lateral projection $G^2$ carried by the lever G. The cam member E is carried by a shaft $E^2$ connected by speed reducing gears $E^3$ to the shaft of the rotor $E^4$ of the motor.

The motor as shown in Fig. 7, comprises a bipolar stator energized by a main winding EA and having each main pole slotted to form a shading pole at each side of an unshaded central portion. Each of the four shading poles is surrounded by a corresponding one of four shading coils EB, EC, ED, and EF. The shading poles surrounded by the windings EB and EF form part of one main pole, and are diametrically opposed to the shading poles pertaining to the other main pole and surrounded by the windings ED and EC, respectively. As shown, the shading coils EB, EC, ED, and EF are connected in series, and collectively form one of the two energizing windings of the motor, the other winding being the main coil EA. The shading coils are so connected and arranged, that when the current flows through those coils and through the main winding EA, are in the directions of the arrows shown in Fig. 7, the magnetizing actions on the shading poles surrounded by the windings EB and ED, due to those windings, and to the main winding EA, are in the same direction, while the magnetizing actions on the other two shading poles, due to their windings EC and EF and to the main winding EA, are in opposite directions.

The inductance of the motor winding EA, is high, so that the current in the winding lags almost 90° behind the E. M. F. impressed on the winding, while the inductance of the motor winding, including the shading coils is somewhat smaller, so that the current in that circuit lags appreciably less than 90° behind the voltage impressed on the last mentioned winding. In consequence, when the voltage impressed on the winding including the shading coils, is in phase with the voltage impressed on the winding EA, the rotor E⁴, which has a squirrel cage winding, will rotate in the clockwise direction, and when the voltage impressed on the circuit including the shading coils is 180° out of phase with the voltage impressed on the primary winding EA, the stator will rotate in the counter-clockwise direction.

An angular adjustment of the lever G about its pivot G', results in a corresponding angular adjustment in the opposite direction of the pointer A', through means comprising a lever H carried by a pivot shaft H' supported by the instrument framework and having one end shaped as a gear segment H², which is in mesh with a spur gear carried by the pointer A' and coaxial with the shaft A². The other arm of the lever H is connected by a link HG to the lever G. To permit of instrument calibration, the link HG is connected to the lever G by means of an adjustable part HG' to which the upper end of the link HG is pivotally connected. The part HG' supports a clamping screw G³ passing through a curved slot G⁴ in an arm G⁵ rigidly secured to the lever G. The slot G⁴ has its concave side toward the pivot H' and is parallel in its general direction to the length of the lever G. By adjustment of the clamping screw G³, the part HG' can be secured to the arm G⁵ at different points along the length of the slot G⁴, and therefore at different distances from the axis of the fulcrum shaft G' of the lever G. The adjustment of the part HG' along the slot G⁴ thus changes the instrument sensitivity, or ratio of the angular movements of the lever G and pointer A'.

As previously stated, engagement and separation of the contacts F and $f$, control the operation of the motor E through an amplifier relay controller I. The characteristic features of that controller, and its association with the motor E, are shown diagrammatically in Fig. 3. The amplifier relay controller comprises a power transformer I' having a primary winding connected between alternating current supply conductors I and 2, and having three secondary windings. One of those secondary windings supplies current through conductors 6 and 7 to the filament of a rectifier tube L², which may be, and is shown as, of standard type. Another of the secondary windings of the transformer I' has its terminals connected to the rectifier tube plates or anodes L³ and L⁴, by conductors 8 and 9, respectively. The third secondary winding of the transformer I' has its terminals connected by conductors 10 and 11 to the filament of a triode amplifying tube L⁵, which may be, and as shown is of standard type.

The amplifier relay controller includes an output transformer L⁶, having one terminal of its primary connected by a conductor 12 to the plate element of the tube L⁵, and having its other terminal connected by a conductor 13 to the filament of the rectifier tube L². The secondary of the output transformer L⁶ is connected in series with the motor shading coils EB, EC, ED, and EF. The contact F is connected by a conductor 16 to the conductor 8, and thereby to the rectifier tube plate L³. The contact $f$ is connected by a conductor 17 including a resistance 18, to a conductor 19, which is connected at one end to the grid element of the amplifying tube L⁵. The other end of the conductor 19 is connected through a resistance 20 to the rectifier tube plate L⁴. For the purposes of the present invention, the resistance 20 should be substantially larger than the resistance 18. For example, the resistance 20 may be three megohms, while the resistance 18 may be one megohm. The secondary winding of the power transformer I' having its terminals connected to the rectifier plates L³ and L⁴, has its mid point connected by a conductor 21 to the mid point of the secondary winding of the transformer, which has its terminals connected to the filament of the amplifier tube L⁵. The main winding EA of the motor E is connected between the alternating supply conductors 1 and 2.

With the arrangement illustrated in Fig. 3, the secondary of the output transformer L⁶ impresses an alternating current voltage on the motor winding including the shading coils EB, EC, ED, and EF, which has the same frequency as the alternating current voltage impressed on the second energizing winding EA by the supply conductors 1 and 2 and the voltages impressed on the two motor energizing windings are approximately in phase, or are approximately 180° out of phase, depending on the relative position of the contacts F and $f$. The actual direction of turning movement of the rotor E⁴, with either phase relation, depends on the circuit connections and may be reversed by varying those connections, as, for example, by interchanging the connection between either motor energizing winding and its energizing source, i. e., conductors 1 and 2 or output transformer secondary. In the explanations of the operation of the apparatus shown in Figs. 1 and 3 it is assumed that the circuit connections are such that when contacts F and $f$ are separated, the two energizing voltages are approximately in phase, and the rotor E⁴ turns, or tends to turn, in the direction to move the contact $f$ into engagement with the contact F, and that when contacts F and $f$ are in engagement, the energizing voltages are approximately 180° out of phase, and the rotor E⁴ turns, or tends to turn, in the direction to move the contact $f$ out of engagement with the contact F.

When the contacts F and $f$ are in engagement or out of engagement, for any appreciable time interval, the rotor E⁴ will be given significant turning movement in one direction or the other. When the rate of flow is constant, the contacts F and $f$ engage and separate in rapid alternation. As hereinafter explained, such chattering engagement of the contacts F and $f$ when the rate of flow is constant, may be due to, and necessarily result in, rapid, small amplitude oscillatory movements of the rotor E⁴, or may be effected without such oscillatory movement of the rotor. Because of the relatively minute magnitude of the current required to flow through the contacts F and $f$ when they are in engagement, no significant or detrimental arcing occurs when the contacts are separated.

The voltage at the secondary terminals of the output transformer L⁶, has the frequency and phase characteristics described above, as a result of the flow of pulsating currents through the primary winding of the output transformer L⁶, and the phase relation of the current pulsations to the potential alternations of the supply conductors 1 and 2, and that phase relation depends on whether the grid element of the tube $L^5$, is given an effective bias in the positive direction by the plate $L^3$, or by the plate $L^4$ of the rectifier $L^2$. When the contacts F and f are out of engagement, the grid element of the amplifier tube $L^5$ is given a more positive bias during the half wave periods in which the potential of the rectifier plate or anode $L^4$ is positive, and when the contacts F and f are in engagement, said grid element is more positively biased during half wave periods in which the potential of the plate $L^3$ is positive.

In Fig. 8, $PL^3$ is a sinusoidal curve representing the varying potential of the anode $L^3$ of the rectifier tube $L^2$, and $PL^4$ is a similar curve representing the varying potential of the anode $L^4$. The portions of such curve above the base line XX represent positive anode voltages. With the contacts F and f not in engagement, the rectifier tube anode $L^4$, when its potential is positive, gives a more positive bias to the control grid element of the amplifying tube $L^5$, and permits a corresponding plate current flow through the tube $L^5$ and the output transformer primary. The latter thus has impressed upon it voltage impulses, one for every other half wave of the alternating voltage between the supply conductors 1 and 2. Those voltage pulsations are represented by the successive curve sections VA of Fig. 9, and induce an alternating current voltage in the secondary winding of the output transformer, which may be assumed to be represented collectively by the curve sections VA and the dotted line curve sections va of Fig. 9.

When the contacts F and f are closed and the potential of the rectifier anode $L^3$ is positive, the latter exerts a positive biasing action on the control grid of the amplifying tube $L^5$, through the circuit including conductor 16, contacts F and f, conductor 17, resistance 18, and conductor 19. When the anode $L^3$ is positive, the anode $L^4$ is negative, and with the contacts open, would give the control grid a greater negative bias, but with the resistance 20 substantially larger than the resistance 18, the control grid bias is controlled and more positive by the anode $L^3$, during periods in which the potential of the latter is positive and the control contacts are in engagement. In Fig. 10, the curve sections VB represent the voltage pulsations impressed on the output transformer primary when the anode $L^3$, exerts its positive biasing action on control grid and the sections VB in conjunction with the dotted curve sections vb, represent the output transformer secondary voltage. In curves 8, 9 and 10 the left hand end points of the three lines X—X, represent the same time instant.

In addition to the above mentioned advantages of the amplifier relay controller and motor arrangement shown in Figs. 1–4, it is to be noted that the type of motor shown is inherently simple and relatively inexpensive in construction, and is well adapted for use in small size units which can be readily incorporated in control instruments housed in casings of customary size and form. The operation of the motor is especially advantageous for the use illustrated, moreover, because it is adapted to stop instantly when current flow through the winding including the shading coils, is interrupted, and hence, with the arrangement shown, the motor is adapted to reverse quickly when conditions require such reversal.

The principles of the present invention are adapted for use for a variety of purposes and with apparatus materially different in form from that illustrated in Figs. 1 and 3. In particular the control contacts may take very different forms. In one modified control contact arrangement, for example, which is illustrated in Fig. 5, the contact FA directly connected to, and actuated by the receiver armature d, is in effect a lever having one arm extending into a contact enclosure FB, which may be supported by the lever G. The container has a flexible end wall FB' through which the contact FA extends, and in which it is anchored, so that it forms a fulcrum for angular movement of the lever contact FA relative to the cooperating contact fa, which extends into the container FB and may be immovable relative to the latter. The container FB may be evacuated or filled with an inert gas, and its body may be formed of glass, but the end wall FB' is formed of a suitable flexible metal.

In another contact arrangement shown in Fig. 6, the contact FC directly actuated by the receiver armature stem $d^3$, is in the form of a lever fulcrumed in a fulcrum block FD carried by the lever G, and the cooperating contact fc is supported by the lever G at a suitable distance from the block FD. With the arrangement shown in Fig. 6, a given vertical movement of the stem $d^3$ results in a much greater movement of the other end of the contact FC relative to the contact fc.

The contact shown in Fig. 11 is adapted for use in lieu of the control contact arrangement shown in Figs. 1, 3, and 4, and includes means for automatically connecting and disconnecting the control circuit conductors 16 and 17 in rapid alternation where the flow through the conduit B is stationary and the motor E has operated to move the lever G into its normal position relative to the armature d. The contacts $FA^{10}$ and $fa^{10}$ are mounted and enclosed, as are the contacts FA and fa of Fig. 5, but are shaped and disposed to be electrically connected only through a third vibratory contact part $f^{11}$, which is electrically and mechanically connected to the contact $fa^{10}$, by a resilient connection $f^{12}$. The contact $f^{11}$ is formed of, or includes magnetic material and forms the armature of an electro-magnet including a winding $f^{13}$ through which the conductor 17 is connected to the contact part $f^{11}$ and thereby to the contact part $fa^{10}$.

When the relative position of the contacts $FA^{10}$ and $fa^{10}$ permits the contact part $f^{11}$ to move into engagement with the contact $FA^{10}$, that engagement connects the conductors 16 and 17 and energizes the coil $F^{13}$, which then pulls the contact part $f^{11}$ out of engagement with the contact part $FA^{10}$. The vibratory movement given to the part $f^{11}$ when the latter is permitted to thus engage and separate from the contact $FA^{10}$, is of such high frequency that with a motor E suitably designed for the purpose, its rotor $E^4$ will remain stationary, or practically stationary, notwithstanding its tendency to rotate first in the one direction and then in the other direction as the contact parts $f^{11}$ and $FA^{10}$ engage and separate. On a change in the rate of flow, producing an up-movement of the armature d, the contact $FA^{10}$ is tilted counter-clockwise so that the contact $fa^{10}$ then prevents contact $f^{11}$ from moving into engagement with the contact $FA^{10}$, and the motor E then operates in the direction to adjust the lever G and thereby the contact $fa^{10}$, so as to restore the relative positions of the contacts $FA^{10}$ and $fa^{10}$ shown in Fig. 11. Conversely, on a change in the rate of flow in the conduit B, resulting in a clockwise adjustment of the contact $FA^{10}$, the latter holds the contact part $f^{11}$ against a stop $f^{14}$, so that the conductors 16 and 17 are then continuously connected, until the operation of the motor E adjusts the lever G and thereby the contact $fa^{10}$ as required to restore the relative positions of the parts shown in Fig. 11.

To permit the location of the contact part $f^{11}$ above the contact $FA^{10}$, so that the contact part $f^{11}$ has a gravitational bias for movement into engagement with the contact $FA^{10}$, the circuit connections shown in Fig. 3, must be modified, so that the motor E will operate to give a clockwise or counter-clockwise adjustment to the lever G, as a result of a counter-clockwise or clockwise adjustment, respectively, given the contact $FA^{10}$ by the armature $d$.

The operative effect of the special vibratory contact arrangement illustrated in Fig. 11 can be obtained in other ways, and is not required in all cases. The contact arrangement shown in Figs. 1, 3 and 4, if there is no significant lost motion due to gear back lash or other cause, in the connection between the shaft of the rotor $E^4$ and the lever G, oscillatory movement of the rotor $E^4$ through the necessary small range of movement, required for sufficient movements of the contact F to effect a chattering engagement of the contacts F and $f$, may be practically unobjectionable. The tendency to a resultant vibratory or hunting motion of the pointer $A'$, if objectionable, may be practically eliminated in some cases, by providing lost motion or a resilient link in the mechanical connection between the lever G and the pointer $A'$. With considerable lost motion in the connection between the rotor $E^4$ and the lever G, any resultant tendency to an objectionable vibratory or hunting movement of the pointer $A'$ of the Fig. 1 arrangement, can be avoided, as already indicated, by the use of other arrangements than that shown in Fig. 11, as, for example, by a direct mechanical connection between the motor E and the contact $f$ which is separate from the connection between the rotor $E^4$ and the lever G, whereby a small oscillation of the rotor $E^4$ will vibrate the contact $f$ without taking up the lost motion necessary to give a vibratory movement to the lever G and pointer $A'$.

It is possible in some cases, also, to obtain the same sort of vibratory contact action obtainable with the special arrangement of Fig. 11, by designing the induction bridge of the apparatus shown in Fig. 1, so that with the armature D stationary, the armature $d$ will have a tremor or vertical vibration, with the frequency of the alternating current energizing the bridge, of sufficient amplitude which, while small, will move the contact F relative to the contact $f$ sufficiently to open and close the circuit including the conductors 16 and 17 for periods too short to produce turning movements of the rotor $E^4$. Still other arrangements for obtaining the effect for which the contact arrangement of Fig. 11 was devised, are illustrated in Figs. 14 and 16.

The means shown in Fig. 1 for angularly adjusting the pointer $A'$, are adapted for use in giving angular adjustments to the pointer which are in linear proportion to the reverse angular adjustments of the lever G, and hence do not vary in linear proportion to the rate of flow through the conduit B, but in linear proportion to the square of said rate of flow. In some cases it is desirable to move the pointer or analogous exhibiting element in linear proportion to the varying rate of flow through the conduit. This result may be obtained, for example, by shaping the cam member $E^1$ so that its required angular movement, as the rate of flow changes, will be proportional to the change in the rate of flow, and by utilizing the cam directly to give movements to the link GH. To this end, as shown in Fig. 2, the adjustable connection part $HG^1$ may be adjustably mounted in a slot formed in an arm EH adjustably secured to the cam $E^1$. Theoretically the cam surface would approach a shape circular about the cam axis at the end corresponding to zero flow. Desirably the cam $E^1$ should be so shaped slightly beyond the zero position that a large clockwise movement of lever G is permitted, thereby positively closing contact $f$.

While the motor of Figs. 1, 3 and 7 is of a desirable form, it may be replaced for use in the practice of the more general principles of the present invention by motors of different forms. In particular, use may be advantageously made in some cases of a motor, which may take various forms, characterized by its capacity for operation in one direction or in the opposite direction, accordingly, as an energizing winding of the motor is rendered operative or inoperative, and with such a motor, the said winding may be rendered operative or inoperative by connecting it in series with the control contacts of any of the forms previously described, and without making use of the amplifier relay controller illustrated diagrammatically in Fig. 3.

Thus, for example, in the modification of the apparatus shown in Fig. 1, diagrammatically illustrated in Fig. 12, the motor E is replaced by a so-called condenser motor $e$, including one set of windings for one phase and two other sets of windings for a second phase and adapted to operate in one direction or in the opposite direction to give corresponding adjustments to the contact $f$, accordingly, as one of the two said other sets of windings, that is connected in series with the contacts F and $f$, is rendered operative or inoperative by the engagement or separation of those contacts.

The motor shown in Fig. 12 comprises a set of windings including two windings $EA^1$ and $EA^2$, which are connected in series with one another between conductors 22 and 23. The conductor 22 is a branch from the supply conductor 1, and the conductor 23 is connected to the supply conductor 1 through a condenser $E^{10}$. One of said two other sets of windings of the motor $e$ comprises two sections $E^{11}$ and $E^{12}$ and a resistance $E^{130}$ permanently connected in series with one another between the supply conductor 2 and the conductor 23, at a point in the latter between the winding $EA^2$ and the condenser $E^{10}$. The second of the other sets of windings of the motor $e$ comprises sections $E^{14}$ and $E^{13}$ connected in series with one another between the contact F and the conductor 23 at a point in the latter between the coil section $EA^2$ and the condenser $E^{10}$. The contact $f$ is connected to the supply conductor 2 by a conductor 24, so that the set of windings including the section $E^{14}$ and $E^{13}$ is energized and deenergized by movements of the contacts F and $f$ into and out of engagement with one another. Because of the capacitative effect of the condenser $E^{10}$, the current through windings $E^{11}$ and $E^{12}$ or $E^{13}$ and $E^{14}$ leads by approximately 90° the current through windings EA¹ and EA².

With the windings E¹³ and E¹⁴ rendered inoperative by the separation of contacts F and f, the windings E¹¹ and E¹² cooperate with the windings EA¹ and EA² to effect motor operation in the direction moving the contact f toward and into engagement with the contact F. The two sets of windings E¹¹—E¹² and E¹³—E¹⁴ tend to rotate the motor in opposite directions and because of the current limiting effect of the resistance E¹³⁰, the magnetizing action of the windings E¹¹ and E¹² is less than the magnetizing action of the windings E¹⁴ and E¹³, so that the motor operates in the direction to move the contact f out of engagement with the contact F, following each movement of the contact f into engagement with the contact F. A chattering engagement of the contacts F and f effected in any of the ways previously described, has the same effect on the operation of the motor e, as on the operation of the motor E.

In the modification of the apparatus shown in Fig. 1, which is illustrated in Fig. 13, the motor ea is a series reversible motor having two field windings E¹⁵ and E¹⁶. The field winding E¹⁵ is permanently connected between the supply conductors 1 and 2 in series with the motor armature and a resistance E¹⁷, and effects armature rotation in the direction to move the contact f toward and into engagement with the contact F when the winding E¹⁶ is inoperative. When the winding E¹⁶ is operative, its effect overpowers that of the winding 15 and causes the motor armature to rotate in the direction to move the contact f out of engagement with and away from the contact F. The winding E¹⁶, contacts F and f, and motor armature, are connected in series between the supply conductors 1 and 2, and the winding E¹⁶ is thus energized only when the contacts F and f are in engagement. The motor ea is held against motion, or effective motion by a chattering engagement of the contacts F and f, as are the motors E and e previously described. As will be clear, the foregoing is equally applicable to a motor in which the armature is not included in the field circuits.

The apparatus shown in Fig. 14 includes a relay motor and amplifier relay controller arrangement which is substantially identical with that collectively shown in Figs. 1 and 3, except in respect to the means provided for rendering the control circuit, including the conductors 16 and 17, operative and inoperative for its purpose of subjecting the control grid of the amplifying tube L⁵ to the bias action of the anode L³ of the rectifier tube L². In Fig. 14, the power transformer secondary having its terminals connected to the rectifier anodes L³ and L⁴ has its mid point connected to a conductor 21—A to the filament of the amplifying tube L⁵, but this is an unimportant variation of the arrangement shown in Fig. 3. In Fig. 14, in lieu of a relatively movable contact connection between the conductors 16 and 17 of the control circuit, those conductors are directly connected at all times by a resistance J which is adapted to be varied through such wide limits and with such rapidity that the practical effect of the resistance variation on the operation of the relay motor E is the same as is obtained by moving the contacts F and f of Figs. 1 and 3 into and out of engagement with one another.

In the arrangement of Fig. 14, the resistance J is a selenium cell or light sensitive device, which when subjected to light from a light source LA and condensing lens LA', has a conductivity substantially greater than that of the resistance 18, and when not subject to such light, has a resistance substantially greater than that of the resistance 20. The mirror K is carried by the movable element of a galvanometer M having its terminals connected by conductors 24 and 25 to and deflecting clockwise or counter-clockwise on increases and decreases respectively in the voltage of a thermocouple T, or other source of small current variations to which the apparatus shown in Fig. 14 is responsive. The resistance J is mounted on a control table or support O angularly adjustable about the axis of deflection of the galvanometer and is angularly adjusted by the motor E. To that end the shaft of the rotor E⁴, is shown as carrying a worm E²⁰, in mesh with a worm gear portion O' of the table O.

As shown, the circuit connections are such that the galvanometer turns clockwise as the temperature and voltage of the thermocouple T increases and the motor E is arranged to give a clockwise rotation to the table O, when the clockwise rotation of the light beam carries the latter away from the resistance J, and thereby renders the control circuit including the resistance J, inoperative. When the light beam impinges on the resistance J, either as a result of movement of the resistance J into the path of the beam, or as a result of a counter-clockwise deflection of the beam, the control circuit, which includes the resistance J, is made operative by the increased conductivity of the resistance J, just as the control circuit, including the contacts F and f of Fig. 3 is rendered operative when those contacts engage. In consequence, the resistance J will always be kept wholly or partly to the counter-clockwise side of the beam, and the system will operate to tend to maintain the light beam at the clockwise edge of resistance J.

If the voltage impressed on the galvanometer changed only as a result of a change in the temperature of thermocouple T, the operation of the apparatus of Fig. 14 may be analogous to that of the apparatus shown in Figs. 1 and 3, in that, with the control condition constant, the rotor E⁴, would be given a small amplified oscillation sufficient to alternately move the resistance J into and out of the beam of light reflected by the mirror K.

It is also readily possible with the arrangement shown in Fig. 14, however, to obtain an effect analogous to that obtainable with the use of the vibrating contact arrangement of Fig. 11 in the apparatus shown in Figs. 1 and 3. That result may be obtained, for example, by impressing an alternating voltage on the terminals of the galvanometer M, so that the mirror K will thereby be oscillated alternately in opposite directions from a neutral position which depends upon, and varies with the direct current voltage of the thermocouple T. To this end, the apparatus shown in Fig. 14 includes a step down transformer P which has its secondary included in the conductor 24 and hence in series with the thermocouple T and galvanometer M. The primary of the transformer P is connected between the supply conductors 1 and 2. With the described arrangement, the galvanometer and mirror will deflect from their normal positions dependent on the voltage of the thermocouple alternately in opposite directions with the frequency of the current supplied to the transformer P by the supply conductors 1 and 2. The alternating current voltage impressed on the galvanometer by the transformer P should be only that required for a range of oscillatory movement of the mirror needed for the same sort of effect on the motor, which is produced by the vibratory contact arrangement of Fig. 11.

Since the angular position of the control table O is a measure of the thermocouple voltage, variations in that voltage may be indicated by providing the control table with an index $O^2$ operating in conjunction with a stationary scale $O^3$. The angular adjustments of the control table O may be used, also, to produce a control effect on the thermocouple temperature. To that end, the control table shown in Fig. 14, is provided with an operating arm $O^4$ connected by a pin and slot connection with the operating arm $Q^1$ of a control valve Q to a pipe $Q^2$ supplying fuel to a burner $Q^3$ of a furnace, the temperature of which is measured by the thermocouple T. The motor E is thus adapted to adjust the fuel supply to the furnace as required to maintain an approximately constant furnace temperature.

In lieu of the means shown in Fig. 14 for impressing an alternating potential difference on the galvanometer terminals, I may employ other means to periodically interrupt the impingement on the resistance J, of light reflected by the mirror K during periods in which the thermocouple voltage is constant. For example, as shown in Fig. 16, a vibratory shutter S may be mounted on a control table O for movement into and out of the position in which it is interposed in the path of the light beam passing from the mirror K to the resistance J. As shown, the shutter S is carried by an armature $S^1$ which is biased by a spring $S^2$ for movement out of the position in which the shutter obstructs light impingement on the resistance J, and is adapted for movement into that position by the energization of a solenoid coil $S^3$ in which the armature $S^1$ is axially movable. The coil $S^3$ may be connected between the resistance J and the conductor 16, so that the coil $S^3$ is energized only when the device J is made highly conductive by the impingement of light against it or may be connected to a separate energizing source and be of the well-known vibratory type which when energized operates a back contact to open its energizing circuit and thereby causes oscillation of the shutter S at a suitable frequency. As will be clear, the transformer P may be omitted when the shutter device is used.

Fig. 15 illustrates a modification of the apparatus shown in Fig. 14 in which the selenium cell J of Fig. 14 is replaced by two photo electric cells U and UA. The two cells are connected in parallel between the conductor 8 and resistance 18 but with the anode of one and the cathode of the other cell directly connected to the conductor 8, so that the two cells collectively may pass current in either direction through the control circuit including the resistance 18, notwithstanding the fact that each cell is independently capable of transmitting current in one direction only. The two cells U and UA may be mounted, and subjected to light variations, as is the device J of Fig. 14.

In the modification shown in Fig. 17, the relay motor is adapted for direct control by the engagement and separation of the control contacts $fa$ and FA, and operates to adjust the contact $fa$ in the manner described in connection with the forms of the invention illustrated in Figs. 12 and 13.

The motor $eb$ differs from the motors $e$ and $ea$, however, in that it is subjected to a constantly acting bias force tending to rotate its armature in one direction, which is opposite to that in which the armature moves when energized from the supply conductors 50 and 51. For the purpose of the present invention, it is immaterial whether the motor $eb$ is a direct current motor or an alternating current motor, provided only that the motor tends to turn in one direction, only, when energized by the supply conductors. As shown, the motor is so energized by the engagement of the contacts FA and $fa$, of a switch of the form shown in Fig. 5, and having its container FB mounted on one arm of a bell crank lever $G^{20}$, pivoted at $G^{21}$. The arm of the lever carrying the switch never turns into a position greatly inclined to the horizontal so that the lever is subjected to a substantially constant gravitational force which tends to turn the lever clockwise, and is due to the weight of the switch and of the lever arm carrying the switch. The lever arm carrying the switch may be provided with an adjustable weight $G^{22}$, when capacity for adjustment of the bias force is desirable.

The second arm $G^{23}$, of the bell crank lever is shown extending downwardly below the pivot $G^{21}$, and is engaged by a crank pin $eb^1$, carried by a crank disc $eb^2$, so that a clockwise rotation of the crank disc from the position shown is necessary to permit clockwise movement of the lever $G^{20}$, under its gravitational bias force, while counterclockwise rotation of the crank disc will give a counterclockwise adjustment to the lever. As shown, the disc $eb^2$, is directly secured to the armature shaft $eb^3$, of the motor $eb$, but the armature shaft may be connected to the disc $eb^2$ by speed reducing gearing, provided the latter is not of a character to prevent clockwise movement of the disc $eb^2$ under the thrust of the lever $G^{20}$ on the crank pin $eb'$, when the motor is deenergized. As shown, the outer end of the contact FA is connected to the armature $d$ of an inductance bridge receiver, as in Fig. 6, and the weight of the armature is carried by a suspension spring $d^{10}$, which should be long enough to avoid material change in its tension as the armature moves between the limits of its up and down movement.

With the arrangement shown in Fig. 17, a down movement of the armature $d$ tilts the contact FA clockwise and moves it away from the contact $fa$, the motor $eb$ is then deenergized, the lever $G20$, tilts clockwise under the action of gravity until the contacts FA and $fa$ engage, the crank disc $eb^2$, being given a corresponding clockwise rotation by the thrust on the crank pin $eb'$ of the arm $G^{23}$ of the lever $G^{20}$. When the contacts FA and $fa$ engage, the motor is energized and rotates the crank disc $eb^2$ counterclockwise, and thereby turns the lever $G^{20}$, counter-clockwise until the contacts FA and $fa$ separate. When the armature $d$ is stationary, the crank disc $eb^2$ will be given an oscillatory movement to effect a chattering engagement of the contacts FA and $fa$, as a result of the energization and deenergization of the motor occurring as the contacts engage and separate. On an upward movement of the armature $d$, the contact FA is held in engagement with the contact $fa$ until the resultant operation of the motor gives a sufficient counter-clockwise adjustment to the lever $G^{20}$ to separate the contacts FA and $fa$.

The edge of the bell crank $G^{23}$ engaging pin $eb^1$ may be shaped to provide for the proper scale shaping for an indicating member which may be attached to or driven by disc $eb^2$ or if desired an indicating element may be attached to lever $G^{20}$.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In combination, electronic amplifying means comprising rectifying tube means adapted for full wave rectification of an alternating current and comprising two anodes alternating in positive potentials with the frequency of the current rectified, an amplifying tube having a control grid and adapted to deliver a pulsating plate current, adjustable control means adapted to make the controlling bias of said control grid vary with the potential of one or the other of said anodes according to the adjustment of said control means, and phase responsive means permanently connected in the plate circuit of said tube and selectively responsive to the phase relation of the plate current pulsations delivered by said amplifying tube.

2. In combination electronic amplifying means comprising rectifying tube means adapted for full wave rectification of an alternating current and comprising two anodes alternating in positive potentials with the frequency of the current rectified, an amplifying tube having a control grid and adapted to deliver a pulsating plate current, adjustable control means adapted to make the controlling bias of said control grid vary with the potential of one or the other of said anodes according to the adjustment of said control means, phase responsive means permanently connected in the plate circuit of said tube and selectively responsive to the phase relation of the plate current pulsations delivered by said amplifying tube, and means actuated by the last mentioned means to subject said control means to a secondary reverse adjustment, following the previously mentioned adjustment.

3. In combination, electronic amplifying means comprising a rectifying tube adapted for full wave rectification of an alternating current and having two anodes alternating in positive potentials with the frequency of the current rectified, an amplifying tube having a control grid and adapted to deliver a pulsating plate current, a separate connection between said grid and each of two points having potentials varying respectively with the potentials of the two anodes, adjustable control means adapted to make the conductivity of one or the other of said connections higher than that of the other according to the adjustment of said control means.

4. The combination with control contacts relatively movable into and out of engagement, of electronic amplifying means comprising a rectifying tube adapted for full wave rectification of an alternating current and having two anodes alternating in positive potentials with the frequency of the current rectified, an amplifying tube having a control grid and adapted to deliver a pulsating plate current, means associated with said contacts for making and breaking a connection, accordingly as said contacts are in or out of engagement, between said grid and a point having a potential varying with the potential of one of said anodes, a connection of greater resistance than the first mentioned connection, between said grid and a second point having a potential varying with the potential of said anodes, and means selectively responsive to the phase relation of the plate current pulsations and the alternating current rectified.

5. In combination, electronic amplifying means comprising rectifying tube means adapted for full wave alternating current rectification and comprising two anodes alternating in positive potentials with the frequency of the current rectified, an amplifying tube having a control grid and adapted to deliver a pulsating plate current, a separate connection between said grid and each of two points varying respectively with the potential of each of said anodes, one of said connections including light sensitive means, and being of greater or less conductivity than the other connection accordingly as said light sensitive means is or is not exposed to light, control means for varying the exposure of said light sensitive means to light, and means selectively responsive to the phase relation of the plate current pulsations and the alternating current rectified.

6. The combination with a movable contact support, of a contact carried by said support, a second contact carried by said support and movable relative thereto into and out of engagement with the first mentioned contact, means adapted to give said second contact adjustment movements in accordance with the variations in a variable quantity, and relay means controlled by said contacts for giving said support movements in one direction or the other as required to give the first mentioned contact movements similar to the said adjustment movements given said second contact.

7. A combination as specified in claim 6, in which the said second contact is a spring arm having one end anchored to said support and forming a resilient support for means for giving said second contact its movements.

8. A combination as specified in claim 6, in which a contact enclosure is secured to said support and is formed with a flexible wall portion, and into which said contacts extend and in which said second contact forms a lever extending through and anchored in said flexible wall portion which forms a fulcrum for said second contact permitting the latter to be tilted into and out of engagement with the first mentioned contact.

9. A combination as specified in claim 6, in which said second contact is pivotally connected between its ends to said support and is tilted into and out of engagement with the first mentioned contact.

10. A combination as specified in claim 6, comprising means for adjusting the first mentioned contact relative to said support.

11. A combination with a movable contact support, of a contact carried by said support, a second contact carried by said support and movable relative thereto into and out of engagement with the first mentioned contact, means adapted to give said second contact adjustment movements in accordance with the variations in a variable quantity, relay means controlled by said contacts for giving said support movements in one direction or the other as required to give the first mentioned contact movements similar to the said adjustment movements given said second contact, and means adapted when said contacts are in proximity to one another to move said contacts into and out of engagement with one another in rapid alternation.

12. A combination with a movable contact support of a contact carried by said support, a second contact carried by said support and movable relative thereto into and out of engagement with the first mentioned contact, means adapted to give said second contact adjustment movements in accordance with the variations in a variable quantity, a reversible electric motor controlled by said contacts for operation in one direction or the other accordingly as said contacts are maintained in or out of engagement with one another to thereby give said support movements in one direction or the other as required to give the first mentioned contact movements similar to the said adjustment movements given said second contact, and means adapted when said contacts are in proximity to one another to move said contacts into and out of engagement with a frequency too great to effect operation of the motor in either direction.

13. A combination with a movable contact, of means adapted to give said contact adjustment movements in accordance with the variations in a variable quantity, a second contact movable into and out of engagement with the first mentioned contact, relay means controlled by said contacts and adapted to move said second contact into or out of engagement with the first mentioned contact accordingly as said contacts are maintained out of, or in engagement with one another, and means operated on the engagement of said contacts when the first mentioned contact is stationary to move said second contact out of and back into engagement with the first mentioned contact alternately with a frequency too great to effect movement of said second contact by said relay means.

14. An exhibiting instrument comprising an armature, a vertically disposed solenoid coil axially receiving said armature and adapted to subject the latter to a varying magnetic action tending to position said armature at varying levels, a lever adapted to turn about a horizontal axis, a contact connected to said lever and forming a yielding support for said armature, a second contact connected to said lever and normally stationary relative to the latter, a movable exhibiting element, and relay mechanism controlled by said contacts and adapted to adjust said lever and exhibiting element in correspondence with the movements of said armature.

15. A combination with a movable contact, of means adapted to move said contact into different positions in accordance with the variations in a variable quantity, a reversible alternating current motor, a second contact adapted to be moved by said motor toward and into engagement with, or out of engagement with and away from the first mentioned contact accordingly as said motor operates in one direction or the other, said motor comprising two energizing windings and being adapted to operate in one direction or the other accordingly as the effective currents in the two windings have one or another of two effective phase relations, and means controlled by said contacts for maintaining one or the other of said phase relations accordingly as said contacts are in or out of engagement with one another.

16. The combination with a movable contact, of means adapted to move said contact into different positions in accordance with the variations in a variable quantity, a reversible alternating current motor, a second contact adapted to be moved by said motor toward and into engagement with, or out of engagement with and away from the first mentioned contact accordingly as said motor operates in one direction or the other, said motor comprising two energizing windings and being adapted to operate in one direction or the other accordingly as the effective currents in the two windings have one or another of two effective phase relations, and means controlled by said contacts for shifting the phase of the effective current in one of said windings in one direction or the other accordingly as said contacts are in or out of engagement with one another.

17. The combination with a galvanometer including an element tending to deflect about an axis in accordance with variations in an electrical quantity impressed upon and to be measured by the galvanometer, means carried by said element adapted to direct a beam of light away from said axis in a direction depending upon the deflective position of said element, light sensitive resistance means, a relay mechanism for relatively adjusting said resistance means and beam accordingly as the resistance value of said resistance means is great or small, and means independent of variations in said quantity interrupting and restoring the operation of said beam and resistance means in rapid alternation when the value of said quantity is such that the first mentioned means tends to direct the beam of light against said resistance means.

18. The combination with a galvanometer including an element deflectible about an axis, of means carried by said element and adapted to direct a beam of light away from said axis in a direction depending upon the deflective position of the galvanometer, means for simultaneously impressing a unidirectional E. M. F. and an alternating E. M. F. on the galvanometer, whereby said element is caused to vibrate through a deflective position varying with said uni-direction E. M. F., a light sensitive resistance, and a relay mechanism controlled by said resistance and adapted to relatively adjust the latter and said beam.

19. The combination with a movable contact, of means adapted to give said contact adjustment movements in accordance with the variations in a variable quantity, a second contact biased for movement in the direction to engage the first mentioned contact, and a motor energized by the engagement of said contacts and adapted when energized to move said second contact out of engagement with the first mentioned contact.

20. The combination with a movable contact, of means adapted to give said contact up and down adjustment movements in accordance with the variations in a variable quantity, a lever pivoted to turn about a horizontal axis and gravitationally biased for turning movement in one direction, a second contact carried by said lever and moved into engagement with the first mentioned contact by movement of said lever in said one direction, and a motor energized by the engagement of said contacts and adapted when energized to move said lever in a direction opposite to the first mentioned direction.

21. In a self-balancing electrical circuit network, means unbalancing said network in response to variations in a variable condition, network rebalancing means, a reversible alternating current motor for actuating said rebalancing means and comprising two energizing windings and being adapted to operate in one direction or the other accordingly as the effective currents in the two windings have one or another of two effective phase relations, motor energizing control means tending continuously to establish one of said phase relations, and second motor energizing control means responsive to unbalance of said circuit in one direction for establishing the other of the two phase relations.

22. In a self-balancing electrical circuit network, means unbalancing said network in response to variations in a variable condition, network rebalancing means, a reversible alternating current motor for actuating said rebalancing means and comprising two energizing windings and being adapted to operate in one direction or the other accordingly as the effective currents in the two windings have one or another of two effective phase relations, an electronic valve controlling said phase relation, control means normally energizing said valve to establish one of said phase relations and thereby operate said motor in a direction tending to unbalance the network in one direction, and second control means responsive to unbalance of the network in the last mentioned direction modifying the energization of said valve and thereby establishing the other of said phase relations.

23. In combination electronic amplifying means comprising rectifying tube means adapted for full wave rectification of an alternating current and comprising two anodes alternating in positive potentials with the frequency of the current rectified, an amplifying tube having a control grid and adapted to deliver a pulsating plate current, adjustable control means adapted to make the controlling bias of said control grid vary with the potential of one or the other of said anodes according to the adjustment of said control means, means to transform the pulsating plate current delivered by said amplifying tube into an alternating current of corresponding phase, means selectively responsive to the phase of the alternating current produced by said transforming means, and means actuated by said responsive means to subject said control means to a secondary reverse adjustment, following the previously mentioned adjustment.

24. In combination electronic amplifying means comprising rectifying tube means adapted for full wave rectification of an alternating current and comprising two anodes alternating in positive potentials with the frequency of the current rectified, a transformer having a primary winding and a secondary winding, an amplifying tube having a control grid and adapted to deliver a pulsating plate current to the primary winding of said transformer to thereby induce an alternating current in the secondary winding thereof, adjustable control means adapted to make the controlling bias of said control grid vary with the potential of one or the other of said anodes according to the adjustment of said control means, means selectively responsive to the phase of the alternating current induced in the secondary winding of said transformer, and means actuated by said responsive means to subject said control means to a secondary reverse adjustment, following the previously mentioned adjustment.

THOMAS R. HARRISON.